United States Patent
Miyata (10) Patent No.: US 9,407,054 B2
(45) Date of Patent: Aug. 2, 2016

(54) LASER PROCESSING APPARATUS CARRYING OUT CONTROL TO REDUCE CONSUMED POWER

(71) Applicant: FANUC CORPORATION, Minamitsuru-gun, Yamanashi (JP)

(72) Inventor: Ryusuke Miyata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 160 days.

(21) Appl. No.: 14/249,925

(22) Filed: Apr. 10, 2014

(65) Prior Publication Data

US 2014/0307751 A1 Oct. 16, 2014

(30) Foreign Application Priority Data

Apr. 15, 2013 (JP) ................................ 2013-084688

(51) Int. Cl.
*H01S 3/104* (2006.01)
*B23K 26/00* (2014.01)
*B23K 26/70* (2014.01)
(Continued)

(52) U.S. Cl.
CPC ............ *H01S 3/032* (2013.01); *B23K 26/0626* (2013.01); *B23K 26/1435* (2013.01); *B23K 26/70* (2015.10); *H01S 3/09702* (2013.01);
(Continued)

(58) Field of Classification Search
CPC ...... B23K 26/00; B23K 26/422; B23K 37/00; B23K 26/70; H01S 3/097; H01S 3/041; H01S 3/104

USPC .............. 219/121.7, 121.84, 121.62, 121.72; 700/166; 372/19, 38.03; 315/291
See application file for complete search history.

(56) References Cited

U.S. PATENT DOCUMENTS 4,430,739 A * 2/1984 McMahan ............... H01S 3/104
372/38.05
(Continued)

FOREIGN PATENT DOCUMENTS

CN 1161267 10/1997
CN 101034285 9/2007
(Continued)

OTHER PUBLICATIONS

Albrecht, Volker: Effizient zum Blechteil. In: Industrieanzeiger, 2010, H. 25, S. 50-53. ISSN 0019-9036.

*Primary Examiner* — Samuel M Heinrich
(74) *Attorney, Agent, or Firm* — RatnerPrestia (57) ABSTRACT

A laser processing apparatus including a laser oscillator, a laser processing machine, and a control part controlling the laser oscillator and the laser processing machine. The control part includes a preparatory operation part controlling the laser processing machine so as to start a preparatory operation for the laser processing if a preparatory operation command is output and, a mode switching part switching an operating mode of the laser oscillator between a standard standby mode before carrying out the laser processing and an energy saving mode with less consumed power than the standard standby mode, and the mode switching part controls the discharge tube voltage so as to switch the operating mode to the energy saving mode before the preparatory operation command is output and to start a switching operation of the operating mode from the energy saving mode to the standard standby mode when the preparatory operation command is output.

9 Claims, 6 Drawing Sheets

(51) Int. Cl.
*H01S 3/032* (2006.01)
*H01S 3/097* (2006.01)
*B23K 26/06* (2014.01)
*B23K 26/14* (2014.01)
*H01S 3/0971* (2006.01)

(52) U.S. Cl.
CPC ................ *H01S 3/104* (2013.01); *B23K 26/00* (2013.01); *H01S 3/09713* (2013.01)

(56) References Cited

U.S. PATENT DOCUMENTS 6,034,349 A * 3/2000 Ota .................... B23K 26/0656
219/121.68

6,327,295 B1 * 12/2001 Yamashita ........... B23K 26/063
372/109

2007/0213864 A1 9/2007 Iijima

FOREIGN PATENT DOCUMENTS

| JP | 02235588 A | * | 9/1990 |
| JP | 2012-064636 | | 3/2012 |
| JP | 2012-171084 | | 9/2012 |
| WO | WO 9010519 A1 | * | 9/1990 |

* cited by examiner

LASER PROCESSING APPARATUS CARRYING OUT CONTROL TO REDUCE CONSUMED POWER

BACKGROUND OF THE INVENTION

1. Field of the Invention

The present invention relates to a laser processing apparatus which carries out a control to reduce the consumed power of a laser oscillator.

2. Description of the Related Art

In the past, there has been known a laser processing apparatus, which is set to a base discharge state with a low discharge voltage in a standard standby state before carrying out laser processing and which makes the base discharge stop and shifts to an energy saving mode when this base discharge state continues for a predetermined time so as to thereby keep down the consumption of energy in the standby period of a laser processing machine. This apparatus is, for example, described in Japanese Patent Unexamined Publication No. 2012-64636 (JP2012-064636A). In general, in this kind of laser processing apparatus, the operation to cancel the energy saving mode is started in a state where operations to select the pressure of the assist gas to be supplied to the laser processing head and select the processing conditions, etc. have been completed. Therefore, there are the problems that a relatively long time is taken until the operation for canceling the energy saving mode is started, the energy saving mode becomes long in duration, and the amount of energy consumption increases.

On the other hand, in a composite processing machine which successively carries out punching and laser processing, there is known an apparatus, which presets the time required for returning from the energy saving mode to the standard standby state (restore time), shifts to the energy saving mode at the time of punching, and starts the operation to cancel the energy saving mode at a time earlier than the starting time of the laser processing by exactly the restore time. This apparatus is, for example, described in Japanese Patent Unexamined Publication No. 2012-171084A (JP2012-171084A).

However, the time of start of laser processing is not necessarily a constant one. For example, if maintenance work or other non-routine work is carried out and the starting time of the laser processing is shifted, it is difficult to start the operation for ending the energy saving mode at a good timing.

SUMMARY OF THE INVENTION

A gas laser processing apparatus as an aspect of the present invention includes a laser oscillator generating laser light, the laser oscillator having a discharge tube to which a discharge tube voltage is applied and a shutter part provided at an output route of the laser light, a laser processing machine carrying out laser processing by using the laser light output through the output route from the laser oscillator, and a control part controlling the laser oscillator and the laser processing machine in accordance with a processing program. The control part includes a preparatory operation part controlling the laser processing machine so as to start a preparatory operation for the laser processing if a preparatory operation command is output before a laser output command and includes a mode switching part controlling the discharge tube voltage applied to the discharge tube and switching an operating mode of the laser oscillator between a standard standby mode before carrying out the laser processing and an energy saving mode with less consumed power than the standard standby mode, while the mode switching part controls the discharge tube voltage so as to switch the operating mode to the energy saving mode before the preparatory operation command is output and to start a switching operation of the operating mode from the energy saving mode to the standard standby mode when the preparatory operation command is output.

BRIEF DESCRIPTION OF THE DRAWINGS

The objects, features, and advantages of the present invention will become clearer from the following description of embodiments in relation to the attached drawings, in which.

DETAILED DESCRIPTION

Figure 1:
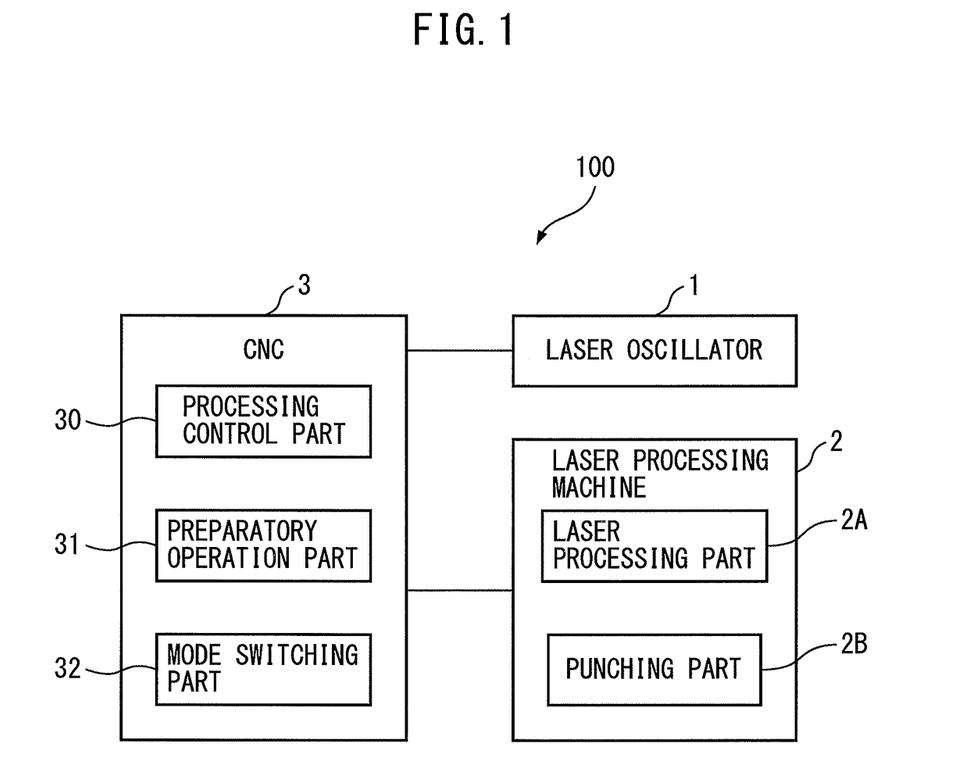
FIG. 1 is a view which shows an overall configuration of a laser processing apparatus according to an embodiment of the present invention.

Below, referring to FIG. 1 to FIG. 6, an embodiment of a laser processing apparatus according to the present invention will be explained. FIG. 1 is a view which shows the overall configuration of a laser processing apparatus 100 according to an embodiment of the present invention. As shown in FIG. 1, the laser processing apparatus 100 has a laser oscillator 1 which generates laser light, a laser processing machine 2 which carries out laser processing by using the laser light which is output from the laser oscillator 1, and a control part 3 which controls the laser oscillator 1 and the laser processing machine 2 in accordance with a processing program.

The laser processing machine 2 is a composite processing machine which has a laser processing part 2A which carries out laser processing on a workpiece and a punching part 2B which punches holes in a workpiece by using a die. It can carry out laser processing and punching selectively and successively.

The control part 3 is mainly comprised of a numerical control device (CNC) and has a processing control part 30 which controls the operations of the laser oscillator 1 and laser processing machine 2 at the time of laser processing and at the time of punching, a preparatory operation part 31 which makes the laser oscillator 1 and laser processing machine 2 carry out preparatory operations before laser processing, and a mode switching part 32 which switches operating modes of the laser oscillator 1 before and after laser processing. The control part 3 includes a reading and interpreting part which reads and interprets a predetermined processing program (NC program), an interpolating part which interpolates a command value which is commanded by the processing program and distributes it to the XYZ feed axes, and a servo amplifier which generates motor drive currents for supply to servo motors 25A, 25B, and 25Z of the laser processing machine 2 (FIG. 2), etc.

Figure 2:
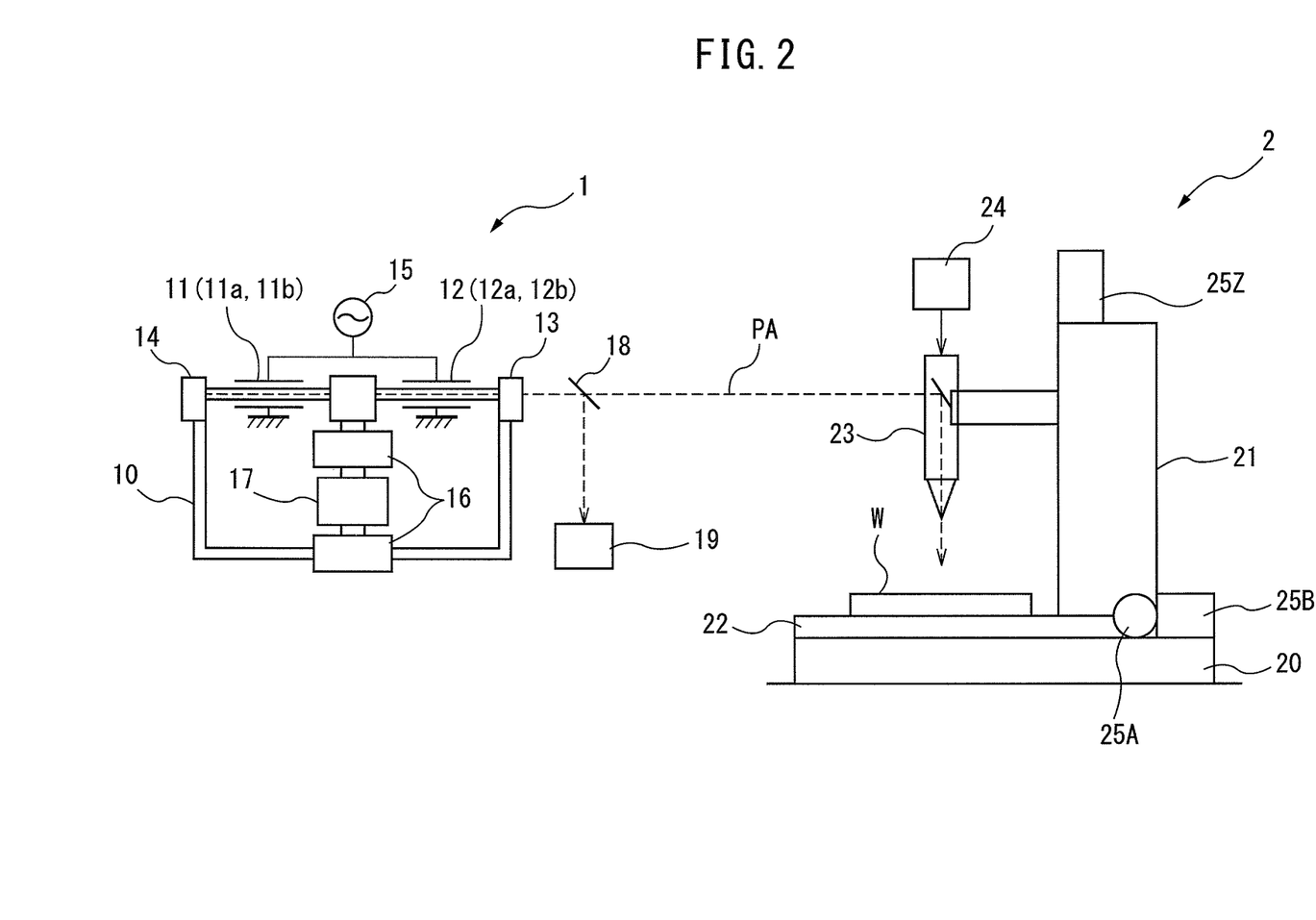
FIG. 2 is a view which shows a principal configuration of a laser oscillator and a laser processing machine of FIG. 1.

FIG. 2 is a view which shows the principal configurations of the laser oscillator 1 and the laser processing machine 2. In FIG. 2, in the configuration of the laser processing machine 2, mainly the configuration of the laser processing part 2A is shown. Illustration of the configuration of the punching part 2B which is provided adjoining the laser processing part 2A is omitted.

As shown in FIG. 2, the laser oscillator 1 has a gas channel 10 through which a laser gas circulates, discharge tubes 11 and 12 which are connected to the gas channel 10, an output mirror 13 and rear mirror 14 which are arranged straddling the discharge tubes 11 and 12, a power supply 15 which supplies voltage (discharge tube voltage) to the discharge tubes 11 and 12, a heat exchanger 16 which cools the laser gas, a blower 17 which makes laser gas circulate along the gas channel 10, and a shutter 18 which is provided at an output route PA of the laser light.

The discharge tubes 11 and 12 respectively have main electrodes 11a and 12a and auxiliary electrodes 11b and 12b. If the main electrodes 11a and 12a are supplied with voltage, that is, are supplied with discharge tube voltage, discharge is started in the laser gas in the discharge tubes 11 and 12. Due to this main discharge, the laser gas is excited and light is generated. Resonance occurs between the output mirror 13 and the rear mirror 14 whereby the light is amplified by stimulated emission. Part of that is taken out as a laser light from the output mirror 13. The taken out laser light is output through the openable/closeable shutter 18 to the laser processing machine 2. When the shutter 18 is closed, output of the laser light to the outside is blocked and the laser light is received by a light absorber 19.

The laser processing machine 2 (laser processing part 2A) has a base 20, a column 21 which is provided standing on the base, a table 22 which is provided movably above the base 20 in the horizontal direction (XY-direction), and a processing head 23 which is provided movably along the column in the vertical direction (Z-direction). Laser light from the laser oscillator 1 is guided to the processing head 23 through the output route PA to carry out laser processing (cutting, drilling, etc.) on a workpiece W supported on the table by using the laser light.

At the time of laser processing, the processing head 23 is supplied with assist gas through an assist gas feeding part 24. The table 22 is driven in the XY-directions along X-direction and Y-direction feed axes through linear feed mechanisms comprised of ball screws extending in the X-direction and Y-direction and servo motors 25A and 25B, etc. driving rotation of the ball screws. The processing head 23 is driven in the Z-direction along a Z-direction feed axis through a linear feed mechanism which is comprised of a ball screw which extends in the Z-direction and a servo motor 25Z, etc. which drive rotation of the ball screw.

During punching or during replacement of the processing material or other times where laser processing is not being carrying out, the laser oscillator 1 is placed by the mode switching part 32 (FIG. 1) in a standby state where the consumed power of the laser oscillator 1 is reduced from the time of laser processing. This standby state includes a state where laser light can be immediately emitted (called a "standard standby mode") and a state where the consumed power is less than the standard standby mode (called a "energy saving mode"). The operating mode of the laser oscillator 1 at the time of laser processing (at the time of laser output) is called a "processing mode".

In the standard standby mode, even if the laser output is zero (0W), the power supply 15 continues to supply the main electrodes 11a and 11b and auxiliary electrodes 11b and 12b with a certain amount of power. The supplied amount of power is adjusted to a state where the main discharge by the main electrodes 11a and 12a is extinguished and a state where only auxiliary discharge by the auxiliary electrodes 11b and 12b is started. This auxiliary discharge is a weak discharge, so does not directly contribute to the laser output, but is maintained as auxiliary discharge for facilitating start of main discharge even in a state where the laser output is zero (0W) and the main discharge is extinguished (state of base discharge). That is, even if the laser output is zero, so long as the gas laser oscillator 1 is not completely stopped, the power supply 15 outputs standby power whereby auxiliary discharge is maintained.

On the other hand, in the energy saving mode, the main electrodes 11a and 11b and auxiliary electrodes 11b and 12b are not supplied with voltage from the power supply 15, so both main discharge and auxiliary discharge are extinguished. That is, in the energy saving mode, the base discharge is stopped. The consumed power is less than that of the standard standby mode by that amount. If an output command (beam emission) is given to the power supply 15 in the state of the energy saving mode where the auxiliary discharge is not activated, the impedance will not match between the power supply 15 and the discharge load and an excessive voltage will be applied to the discharge tubes 11 and 12. As a result, over current will flow to the power supply 15 and the power supply 15 is liable to be damaged or stop in an alarm state.

In order to prevent this, the mode switching part 32 switches the operating mode from the energy saving mode to the standard standby mode if a laser processing command is output from the control part 3 at the time of punching, i.e., in states not carrying out laser processing. In this state, due to the command from the processing control part 30 (FIG. 1), the laser oscillator 1 outputs laser light. At the time of outputting laser light, the operating mode is switched from the standard standby mode to the processing mode.

The laser processing commands include preparatory operation commands which command preparatory operations for enabling laser processing and laser output commands which command laser output. If the laser processing commands are output, first, the preparatory operation commands are output and then, the laser output commands are output. The preparatory operation commands and laser output commands are written in a processing program in advance. A user can also operate a switch, etc. to output these commands.

The preparatory operation part 31 (FIG. 1) starts an operation to prepare for laser processing in accordance with a processing program if a preparatory operation command is output from the control part 3. Specifically, setting of processing conditions such as a duty ratio of the laser output or size of the laser output, a selection of the assist gas pressure for adjusting the pressure of the assist gas to a target value, a movement of the table 22 and processing head 23 to the laser processing positions, an operation to open the shutter 18, etc. are carried out. When these preparatory operations are finished, a laser processing operation becomes possible and a laser output command is output from the control part 3.

In this case, if the mode switching part 32 starts the switching of the operating mode from the energy saving mode of the laser oscillator 1 to the standard standby mode after the completion of the preparatory operation, the energy saving mode becomes longer in duration and the start of the laser processing operation is delayed. As a result, the consumed power increases and the processing efficiency also deteriorates.

In general, it takes about 1 to 2 seconds of time from when preparatory operation commands are output to when preparatory operations such as movement of the feed axis to the processing position, selection of the assist gas pressure, and an operation to open the shutter are completed. As opposed to this, the time required for shift from the energy saving mode of the laser oscillator 1 (state where main discharge and auxiliary discharge are extinguished) to the standard standby mode (state where only auxiliary discharge is on) is within 1 second. This is shorter than the time required for the preparatory operation. Therefore, in the present embodiment, at the same timing as the start of the preparatory operation, a command to switch the operating mode (mode switching command) is output to start the switch of the operating mode from the energy saving mode to the standard standby mode. Due to this, when the preparatory operation has finished, the operating mode has already finished being switched. After the preparatory operation has finished, it is therefore possible to immediately start the laser processing operation.

Figure 3:
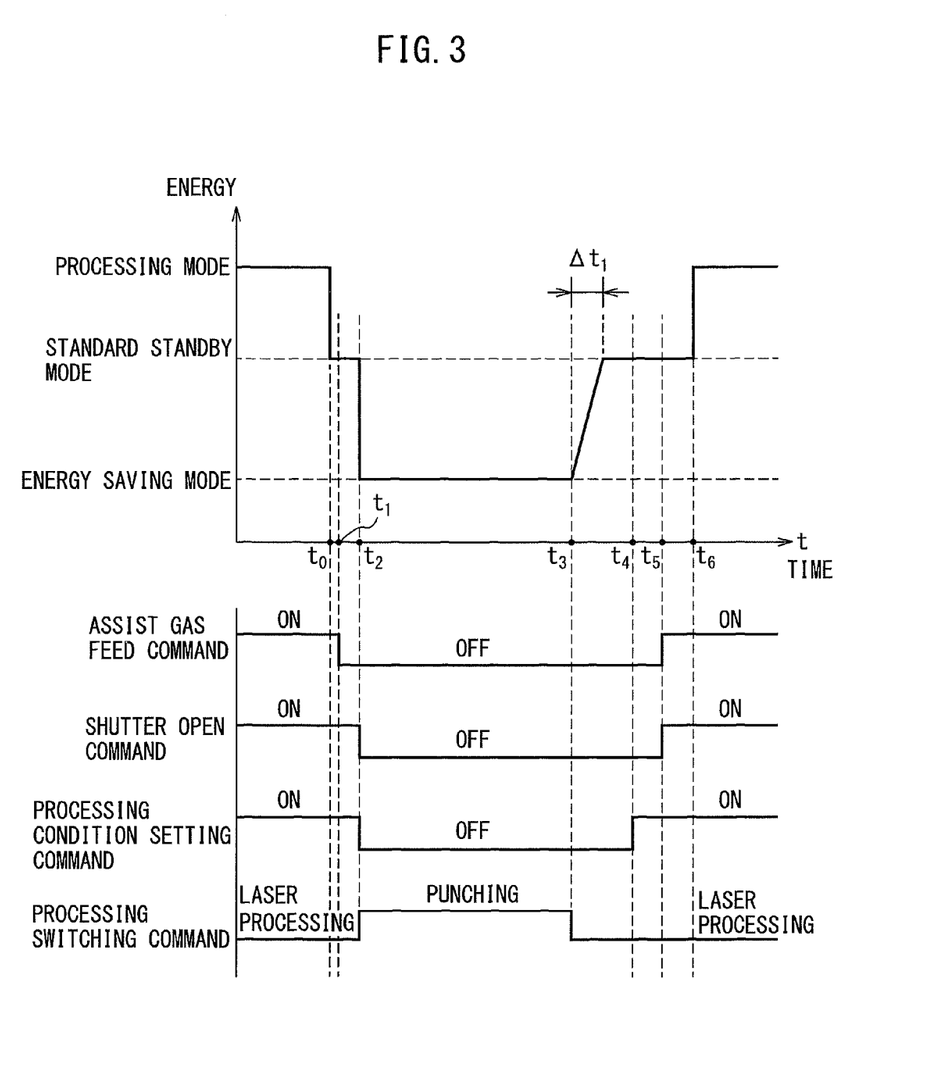
FIG. 3 is a view which shows a time chart which shows one example of the operation of a laser processing apparatus according to an embodiment of the present invention.

A mode switching command is built into the same block in the processing program which outputs a preparatory operation command. Alternatively, a mode switching command is output as the same command as the preparatory operation command. FIG. 3 is a time chart which shows an example of the main operation of the laser processing apparatus 100 according to the present embodiment, i.e., the operation which is obtained by a control signal which is output from the control part 3 to the laser oscillator 1 and laser processing machine 2. Specifically, the timing of switching the operating mode of the laser oscillator 1 (processing mode, standard standby mode, and energy saving mode) and the timing of outputting commands written in the processing program (shutter open command, assist gas feed command, processing condition setting command, and processing switching command) are shown.

If the laser processing ends at the time t0 of FIG. 3, the main discharge of the laser oscillator 1 is extinguished resulting in the base discharge state and the operating mode switches from the processing mode to the standard standby mode. After that, if the assist gas feed command is turned off at the time t1, the preparatory operation part 31 stops the feed of assist gas. Further, if a processing switching command from laser processing to punching is output at the time t2, a mode switching command is output, the mode switching part 32 stops the base discharge of the discharge tubes 11 and 12, and the operating mode is switched from the standard standby mode to the energy saving mode. The shutter open command is turned off at the time t2, whereupon the preparatory operation part 31 closes the shutter 18. The timing of closing the shutter 18 may also be made the time t1. At the time t2, the processing condition setting command is also turned off.

After the end of the punching, if a processing switching command from punching to laser processing as a preparatory operation command is output at the time t3, a mode switching command is simultaneously output whereby the mode switching part 32 starts an operation to switch the operating mode from the energy saving mode to the standard standby mode. The switching operation of the operating mode is carried out by gradually making the command value of the discharge tube voltage which is applied to the discharge tubes 11 and 12 (power output command value) increase. At this time, the discharge tube voltage increases, but if discharge is started, the ratio of change of the discharge tube voltage relative to the power output command value becomes smaller. Therefore, it is judged whether to start discharge based on the ratio of change of the discharge tube voltage relative to the power output command value. If it is judged to start discharge, the increase in the power output command value is stopped. At FIG. 3, it is judged to start discharge after $\Delta t1$ from the time t3. At this time, the laser oscillator 1 becomes the standard standby mode where the auxiliary discharge is started.

After that, a processing condition setting command is output at the time t4 whereby processing conditions of the laser processing (laser output value, etc.) are set. If an assist gas feed command and shutter open command are output at the time t5, the preparatory operation part 31 starts the feed of assist gas and starts the operation to open the shutter 18. Time is taken from when the preparatory operation command is output at the time t3 to when the preparatory operation is finished. At the time t5 when the preparatory operation is finished, the operating mode has already switched from the energy saving mode to the standard standby mode. If the preparatory operation for the laser processing is finished, laser output is commanded by the processing control part 30 and laser processing is carried out. Due to this, the laser oscillator 1 enters the processing mode at the time t6.

According to the above embodiment, the following actions and effects can be exhibited.

(1) If a preparatory operation command of laser processing (processing switching command of time t3 of FIG. 3) is output, the preparatory operation part 31 controls the laser oscillator (shutter 18) and laser processing machine 2 to start the preparatory operation for carrying out the laser processing, while the mode switching part 32 controls the discharge tube voltage to start an switching operation the operating mode from the energy saving mode to the standard standby mode. That is, it outputs a mode switching command at the same time as the preparatory operation command and starts to switch the operating mode at the same timing as the start of the preparatory operation. Due to this, it is possible to carry out an operation to cancel the energy saving mode at a good timing. The duration of the energy saving mode becomes shorter, the standby power is kept down, and the energy saving effect can be raised.

(2) The preparatory operation part 31 opens the shutter 18 of the laser oscillator 1 (time t5 of FIG. 3) after the operating mode of the laser oscillator 1 switches from the energy saving mode to the standard standby mode. Due to this, during the operation for shifting from the energy saving mode to the standard standby mode, the shutter 18 is held in the closed state so it is possible to prevent laser light from being output to the outside when the discharge tube voltage is gradually increased to start the discharge. The preparatory operation part 31 may also judge if the operating mode of the laser oscillator 1 has switched from the energy saving mode to the standard standby mode, and open the shutter 18 of the laser oscillator 1 on the condition that it is judged that the standard standby mode has been switched to.

(3) If a processing switching command from laser processing to punching is output in the state where the laser oscillator 1 is switched to the standard standby mode (time t2 of FIG. 3), the mode switching part 32 switches the operating mode from the standard standby mode to the energy saving mode and the preparatory operation part 31 closes the shutter 18. That is, due to the processing switching command from laser processing to punching which is paired with the processing switching command from punching to laser processing (preparatory operation command), the operating mode is switched from the standard standby mode to the energy saving mode and the shutter 18 is closed. Due to this, the configuration of the processing program can be simplified, the operating mode can be switched and the shutter can be closed by fewer commands, and the processing time can be shortened.

(4) A processing switching command for switching the processing operation from punching to laser processing is used as the preparatory operation command, so it is possible to switch the laser oscillator 1 to the standard standby mode at the timing for switching the processing operation and possible to realize smooth switching to laser processing. Further, the processing switching command is a command which is first output as a laser processing command when carrying out laser processing, so early switching of the operating mode becomes possible. Therefore, the operating mode can be switched to the standard standby mode reliably before the preparatory operation by the preparatory operation part 31 finishes, and the processing mode can be immediately shifted to after the preparatory operation finishes.

Figure 4:
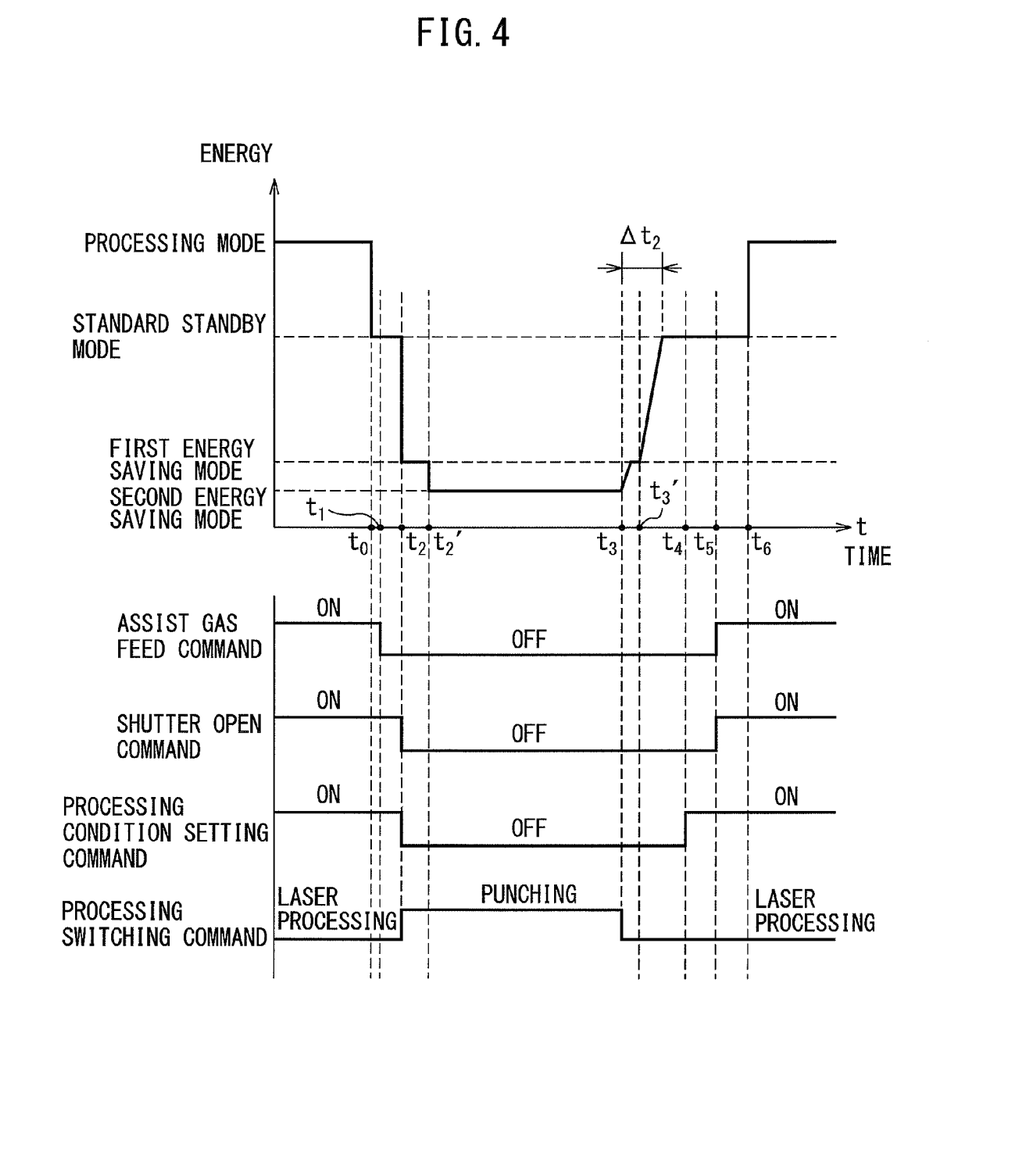
FIG. 4 is a view which shows a modification of FIG. 3.

In the above embodiment, the mode switching part 32 switches the operating mode between the standard standby mode and the energy saving mode, but it is also possible to set a plurality of energy saving modes and successively switch operating modes between the standard standby mode and the plurality of energy saving modes. FIG. 4 is a time chart which shows one example of the operation in this case. In the figure, a first energy saving mode is an operating mode which stops an auxiliary discharge of the laser oscillator 1, while the second energy saving mode is an operating mode which further stops operation of the blower 17 of the laser oscillator 1 from the state of the first energy saving mode. Therefore, the second energy saving mode gives a smaller amount of power consumption (consumed energy) than the first energy saving mode.

As shown in FIG. 4, if a processing switching command is output at the time t2, a mode switching command is simultaneously output whereby the mode switching part 32 switches the operating mode from the standard standby mode to the first energy saving mode. After that, if a mode switching command is output at the time t2', the mode switching part 32 switches the operating mode from the first energy saving mode to the second energy saving mode. Further, if a processing switching command (preparatory operation command) is output at the time t3, a mode switching command is simultaneously output whereby the mode switching part 32 switches the operating mode from the second energy saving mode to the first energy saving mode. After that, if a mode switching command is output at the time t3', the mode switching part 32 switches the operating mode from the first energy saving mode to the standard standby mode. The mode switching commands at the times t2' and t3' are built into the processing program. A user may also operate a switch, etc. to output these mode switching commands. It is also possible to output a mode switching command for switching the operating mode from the second energy saving mode to the first energy saving mode simultaneously with the processing switching command (preparatory operation command).

By setting a plurality of energy saving modes in this way, it is possible to keep down the amount of power consumption of the laser oscillator 1 other than at the time of laser processing much more. If setting a plurality of energy saving modes, more time is taken for return to the standard standby mode than in the case of setting a single energy saving mode. That is, Δt2 of FIG. 4 is longer than Δt1 of FIG. 3. Therefore, it is possible to allow the user to select whether to set a plurality of energy saving modes. For example, if desiring to raise the energy saving effect, it is possible to set a plurality of energy saving modes, while if desiring to start the laser processing as soon as possible, it is possible to set a single energy saving mode.

Figure 5:
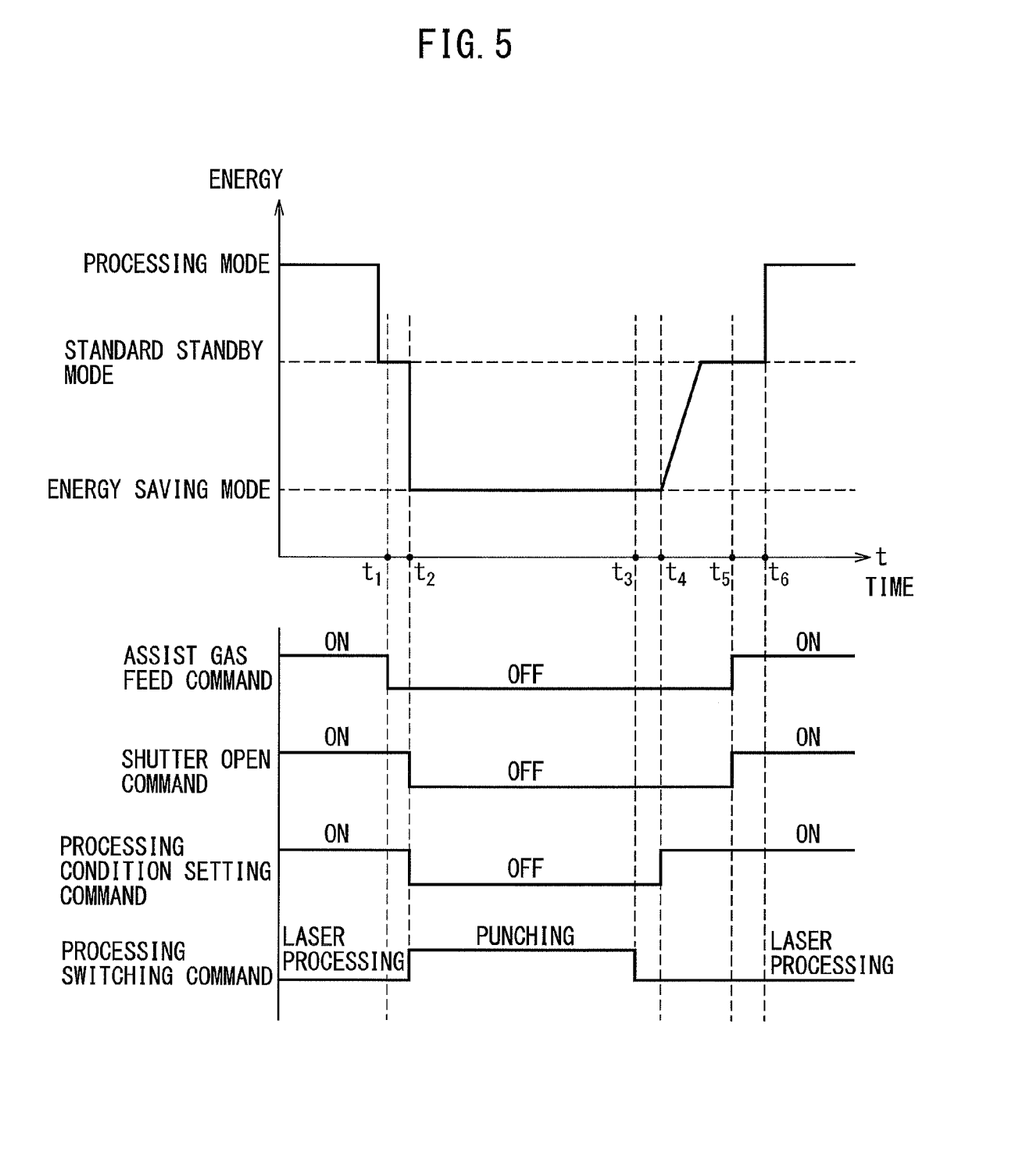
FIG. 5 is a view which shows another modification of FIG. 3.

In the above embodiment, the processing switching command is used as the preparatory operation command, but the processing condition setting command may also be used as the preparatory operation command. FIG. 5 is a time chart which shows one example of the operation in this case. In FIG. 5, if a processing switching command is output at the time t3, then a processing condition setting command is output at the time t4, the mode switching command is simultaneously output. Due to this, the mode switching part 32 switches the operating mode from the energy saving mode to the standard standby mode. After that, at the time t5, the assist gas feed command and shutter open command are output. If the preparatory operations finish, the operating mode becomes the processing mode at the time t6. The processing condition setting command is output after the processing switching command, so it is possible to use the processing condition setting command as the preparatory operation command and thereby shorten the duration of the standard standby mode from that of FIG. 3.

Figure 6:
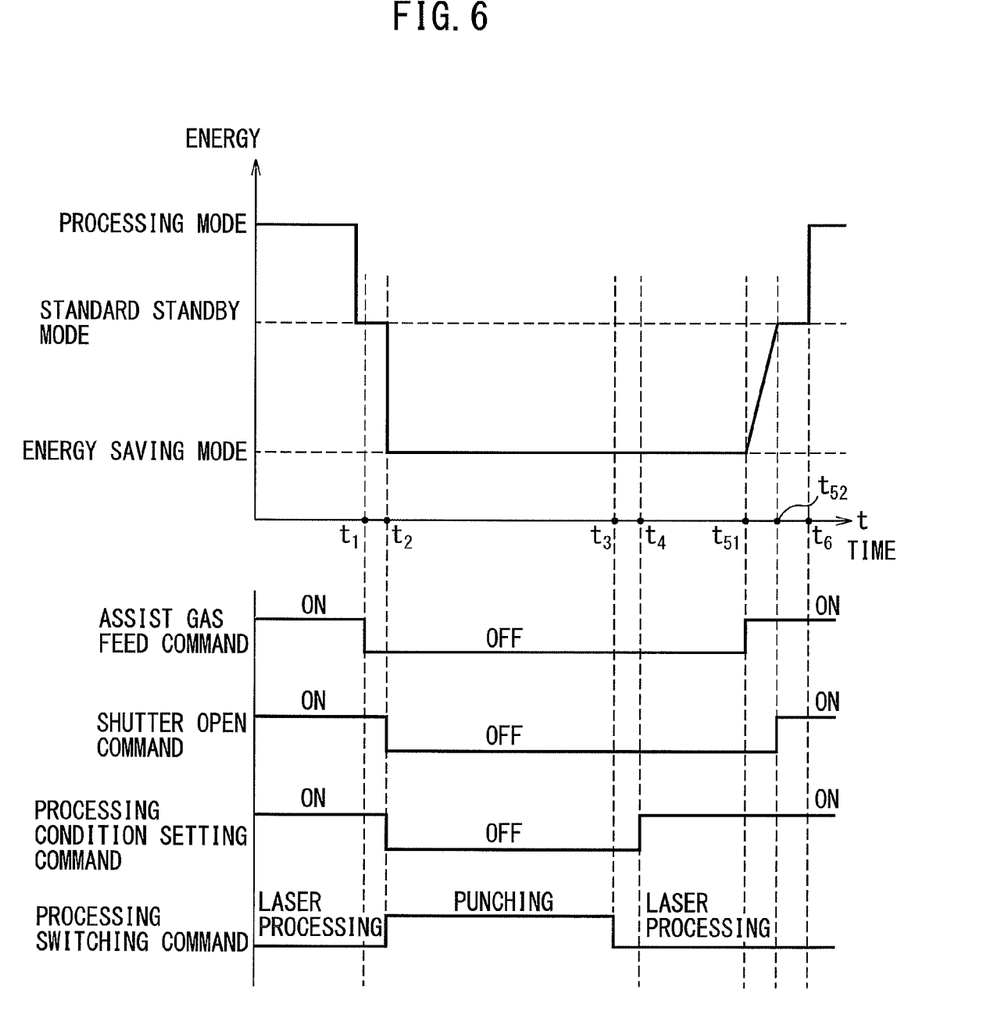
FIG. 6 is a view which shows still another modification of FIG. 3.

The assist gas feed command for starting the feed of assist gas from the assist gas feeding part 24 to the processing head 23 can also be used as the preparatory operation command. FIG. 6 is a time chart which shows one example of the operation in this case. In FIG. 6, a processing switching command is output at the time t3, while a processing condition setting command is output at the time t4. After that, if an assist gas feed command is output at the time t51, a mode switching command is output simultaneously with this. Due to this, the mode switching part 32 switches the operating mode from the energy saving mode to the standard standby mode. If the operating mode finishes being switched, a shutter open command is output at the time t52. If the preparatory operation finishes, the operating mode becomes the processing mode at the time t6. The assist gas feed command is output after the processing condition setting command, so it is possible to shorten the duration of the standard standby mode more by using the assist gas feed command as the preparatory operation command.

It is also possible to use the command to open the shutter 18 as the preparatory operation command. In this case, even if the shutter open command is output, it is preferable that the preparatory operation part 31 control the shutter 18 so as to close the output route PA until the operating mode of the laser oscillator 1 switches from the energy saving mode to the standard standby mode. The processing head positioning command which positions the processing head 23 at a predetermined position or the table positioning command which positions the table 22 at a predetermined position can also be used as the preparatory operation command. Both the processing head positioning command and the table positioning command can also be used as the preparatory operation command. The shutter open command, processing head positioning command, and table positioning command are output after the processing switching command, so the duration of the standard standby mode can be shortened from that of FIG. 3.

In the above embodiment (FIG. 3), a processing switching command from punching to laser processing is used as the mode switching command from the energy saving mode to the standard standby mode (first movement command) and the processing switching command from laser processing to punching paired with this is used as the mode switching command from the standard standby mode to the energy saving mode (second movement command). However, the first and second movement commands in the mutually paired relationship are not limited to this. For example, it is also possible to use the assist gas feed command or shutter open command as the first movement command and to use the assist gas stop command or shutter close command as the second movement command. That is, the first movement command for changing the laser processing machine 2 or shutter 18 (shutter part) from a first state (punching state, assist gas feed state, or shutter open state) to a second state (laser processing state, assist gas stop state, or shutter close state) and the second movement command for changing it from a second state to a first state may be any commands.

In the above embodiment, the laser processing machine 2 is configured as a composite processing machine for carrying out punching and laser processing, but it may also be made a composite processing machine for carrying out laser processing and other processing besides punching. The laser processing apparatus of the present invention can be similarly applied even when configuring the laser processing machine to carry out only laser processing.

The above embodiment may be combined with one or more of the above modifications.

According to the laser processing apparatus of the present invention, if a preparatory operation command of laser processing is output, a switching operation of operating modes from an energy saving mode to a standard standby mode is started, so the operation for canceling the energy saving mode can be performed with a good timing.

While the present invention has been described with reference to the preferred embodiments thereof, a person skilled in the art would understand that various corrections and modifications may be made thereto without departing from the scope of disclosure of the later explained claims.

The invention claimed is:

1. A laser processing apparatus, comprising:
a laser oscillator generating laser light, the laser oscillator having a discharge tube to which a discharge tube voltage is applied and a shutter part provided at an output route of the laser light;
a laser processing machine carrying out laser processing by using the laser light output through the output route from the laser oscillator; and
a control part controlling the laser oscillator and the laser processing machine in accordance with a processing program, wherein
the control part comprises
a preparatory operation part controlling the laser processing machine so as to start a preparatory operation for the laser processing if a preparatory operation command is output before a laser output command and,
a mode switching part controlling the discharge tube voltage applied to the discharge tube and switching an operating mode of the laser oscillator between a standard standby mode before carrying out the laser processing and an energy saving mode with less consumed power than the standard standby mode, and
the mode switching part controls the discharge tube voltage so as to switch the operating mode to the energy saving mode before the preparatory operation command is output and to start a switching operation of the operating mode from the energy saving mode to the standard standby mode at the same time the preparatory operation command Is output.

2. The laser processing apparatus according to claim 1, wherein the preparatory operation part controls the shutter part so as to close the output route until the operating mode of the laser oscillator is switched from the energy saving mode to the standard standby mode.

3. The laser processing apparatus according to claim 2, wherein
the preparatory operation command includes a first shift command for changing the laser processing machine or the shutter part from a first state to a second state,
the mode switching part switches the operating mode from the standard standby mode to the energy saving mode if a second shift command for changing the laser processing machine or the shutter part from the second state to the first state is output in a state where the laser oscillator has been switched to the standard standby mode, and the preparatory operation part controls the shutter part so as to close the output route when the second shift command causes the operating mode to shift to the energy saving mode.

4. A laser processing apparatus, comprising:
a laser oscillator generating laser light, the laser oscillator having a discharge tube to which a discharge tube voltage is applied and a shutter part provided at an output route of the laser light;
a laser processing machine carrying out laser processing by using the laser light output through the output route from the laser oscillator; and
a control part controlling the laser oscillator and the laser processing machine in accordance with a processing program, wherein
the control part comprises:
a preparatory operation part controlling the laser processing machine so as to start a preparatory operation for the laser processing if a preparatory operation command is output before a laser output command, and
a mode switching part controlling the discharge tube voltage applied to the discharge tube and switching an operating mode of the laser oscillator between a standard standby mode before carrying out the laser processing and an enemy saving mode with less consumed power than the standard standby mode, and
the mode switching part controls the discharge tube voltage so as to switch the operating mode to the energy saving mode before the preparatory operation command is output and to start a switching operation of the operating mode from the energy saving mode to the standard standby mode when the preparatory operation command is output,
the preparatory operation part controls the shutter part so as to close the output route until the operating mode of the laser oscillator is switched from the energy saving mode to the standard standby mode,
the energy saving mode includes a first energy saving mode and a second energy saving mode with less consumed power than the first energy saving mode, and
the mode switching part controls the discharge tube voltage so as to switch the operating mode to the second energy saving mode before the preparatory operation command is output and to successively start a switching operation of the operation mode from the second energy saving mode to the first energy saving mode and then from the first energy saving mode to the standard standby mode when the preparatory operation command is output.

5. The laser processing apparatus according to claim 2, wherein
the laser processing machine is a composite processing machine capable of selectively carrying out the laser processing and the other processing, and
the preparatory operation command is a processing switching command for switching a processing operation from the other processing to the laser processing.

6. The laser processing apparatus according to claim 2, wherein the preparatory operation command is a processing condition setting command for setting a processing condition of the laser processing.

7. The laser processing apparatus according to claim 2, wherein
the laser processing machine comprises
a processing head Irradiating an object to be processed with the laser light and an assist gas feeding part supplying assist gas to the processing head, and the preparatory operation command is an assist gas feed command for starting a feed of the assist gas from the assist gas feeding part to the processing head.

8. The laser processing apparatus according to claim 2, wherein the preparatory operation command is a command for opening the shutter part, and the preparatory operation part controls the shutter part so as to close the output route until the operating mode of the laser oscillator switches from the energy saving mode to the standard standby mode.

9. The laser processing apparatus according to claim 2, wherein the laser processing machine comprises a processing head irradiating an object to be processed with the laser light and a table supporting the object to be processed in a movable manner relative to the processing head, and the preparatory operation command is a positioning command for positioning at least one of the processing head and the table at a predetermined position.

\* \* \* \* \*